A. T. HUFF.
Meat-Chopper.
No. 228,535.	Patented June 8, 1880.
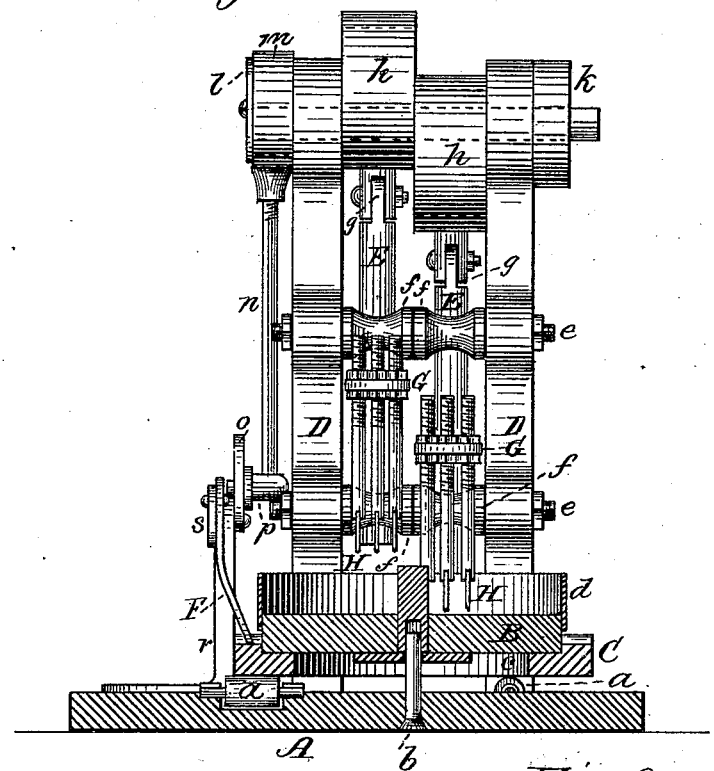
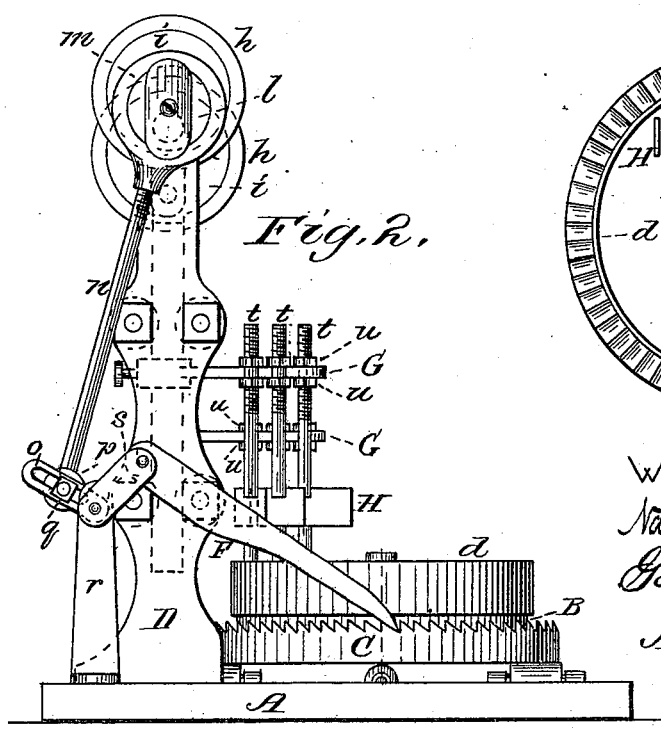
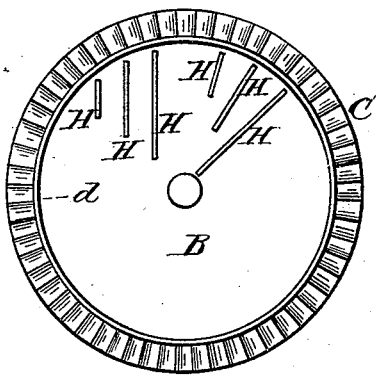
Witnesses
Nat. E. Oliphant
Geo. R. Porter
Inventor
Abraham T. Huff,
per Chas H. Fowler,
Attorney.

UNITED STATES PATENT OFFICE.

ABRAHAM T. HUFF, OF NESHANIC, NEW JERSEY.

MEAT-CHOPPER.

SPECIFICATION forming part of Letters Patent No. 228,535, dated June 8, 1880.

Application filed February 9, 1880.

*To all whom it may concern:*

Be it known that I, ABRAHAM T. HUFF, a citizen of the United States, residing at Neshanic, in the county of Somerset and State of New Jersey, have invented certain new and useful Improvements in Meat-Choppers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a front elevation of my invention, partly in section. Fig. 2 is a side elevation of the same; and Fig. 3, a top-plan view of the chopping-block, showing the relative position and length of the knives.

This invention has relation to that class of meat and vegetable choppers having a rotary chopping-block and a series of vertically-reciprocating knives; and the object of my improvement is to provide means whereby the speed of rotation of the chopping-block is regulated independently of the reciprocating motion of the knives.

A further object of my invention is to so construct and arrange the knives with relation to each other as to insure the meat being cut more thoroughly or finely either at or near the center of the block, at or near the circumference or outer periphery of the same, or in any concentric ring on the block.

I attain these objects by the mechanism substantially as illustrated in the drawings, in which—

A represents the base or platform, having friction-rollers $a$ and central pivot, $b$, upon which the chopping-block B rotates. This chopping-block rests upon a cast-metal flange, $c$, of the circumferential ratchet-plate C, which is secured to the block by screws or other suitable means, so that it will revolve or rotate with it. A rim, $d$, is secured to the block B, which is of sufficient height to retain the meat thereon while being acted upon by the knives.

To the base or platform A are secured two uprights, D, through which pass shafts $e$, and upon which are secured friction-rollers $f$. These friction-rollers bear against each side of shafts E, jointed at $g$ and connected to sleeves $h$, into which are fitted eccentrics $i$, by means of which the shafts are caused to vertically reciprocate alternately.

The horizontal shaft of the eccentrics has a pulley, $k$, by which said shaft is rotated by a belt passing over the same. To the opposite end of the shaft is secured an eccentric, $l$, over which is fitted a sleeve, $m$, having a rod, $n$, provided with screw-threads upon its upper end, so as to admit of its being lengthened or the distance increased or shortened between the sleeve $m$ and slotted plate $o$, to which the lower end of the rod is secured by a crank-arm, $p$, passing through the slotted plate and firmly held by screw-nut $q$. The slotted plate $o$, at one end, is secured to a short pin, which loosely passes through the end of a bracket, $r$, and has secured to its other end a link, $s$, to which is pivoted a pawl, F, to engage with the ratchet-teeth upon the plate C.

Connected to the shafts E in any suitable manner are arms G, of any desirable form or shape, and having slots or openings in their sides for the reception of the shanks $t$ of knives H, held therein by nuts $u$ engaging with the screw-threads upon the ends of the shanks above and below the arms. These shanks, with their knives, may be readily removed from the arms G by simply sliding them laterally out of the slots or openings, thereby entirely avoiding the necessity of removing the upper nuts from off the screw-threaded ends of the shanks, as would be the case were holes made for them which passed through the center of the arms.

The cutting-edges of the knives, as will be noticed, are of different lengths, as illustrated in Fig. 3, and can be adjusted so as to bring the knives parallel with each other or at any desirable angle, so that the incisions made by the knives may be more transverse and the position of the meat automatically changed on the chopping-block, and thereby cut more thoroughly or finely both at or near the center of the block or circumference thereof or in any concentric ring on the block that may be desired by changing the position of the knives. This adjustment or change of position of the knives will regulate the number of incisions, and by removing any desired number of the knives from the arms more incisions may be made in any desired concentric circle of the block.

When motion is imparted to the shaft carrying the eccentrics $i$ the knives are caused to reciprocate vertically and the block B to rotate by the pawl F engaging with the teeth upon the ratchet-plate C. The motion of the pawl is imparted to it by the rod $n$, sleeve $m$, and eccentric $l$ upon the end of the driving-shaft.

The manner of connecting the pawl F to the rod $n$ by the slotted plate $o$ admits of the length of the stroke of the pawl being diminished or increased, which in turn rotates the block B by moving it a distance equal to either one or more of the ratchet-teeth, which movement insures the meat being cut either fine or coarse, as required. This motion of the chopping-block B is regulated independent of the motion of the knives; otherwise the desired result would not be obtained.

Having now fully described my invention, what I claim as new, and desire to secure by Letters Patent, is—

1. The chopping-knives H, of different lengths, adjustably connected to the arms G, the difference in length of their cutting-edges insuring, when their position is changed with relation to each other, of the meat being cut more thoroughly or finely either at or near the center of the chopping-block or near the outer periphery thereof, substantially as specified.

2. In a meat or vegetable chopper, the combination, with the shafts E, connected to the sleeves $h$, and carrying adjustable knives H, of the uprights D and friction-rollers $f$, substantially as and for the purpose described.

3. A meat or vegetable chopper having adjustable knives H, of different lengths, chopping-block B, and means, as shown and described, for regulating the speed of rotation thereof independent of the motion of the knives, as and for the purpose set forth.

In testimony whereof I affix my signature in presence of two witnesses.

ABRAHAM T. HUFF.

Witnesses:
JOHN N. VAN LIEW,
JOHN S. CORLE.